United States Patent
Horng

(10) Patent No.: US 8,710,709 B2
(45) Date of Patent: Apr. 29, 2014

(54) MOTOR WITH POWER-GENERATION COIL MODULE

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 108 days.

(21) Appl. No.: 13/555,496

(22) Filed: Jul. 23, 2012

(65) Prior Publication Data

US 2013/0200759 A1    Aug. 8, 2013

(30) Foreign Application Priority Data

Feb. 6, 2012   (TW) .............................. 101103750 A

(51) Int. Cl.
*H02K 47/00*   (2006.01)

(52) U.S. Cl.
USPC ........................................ 310/113; 310/67 R

(58) Field of Classification Search
USPC ...... 310/67 R, 71, 68 R, 112–114, 261.1, 201
See application file for complete search history.

(56) References Cited

U.S. PATENT DOCUMENTS

| | | | |
|---|---|---|---|
| 2,778,960 A | | 1/1957 | Anderson |
| 2,806,159 A | * | 9/1957 | Sheldon ........................ 310/113 |
| 3,931,535 A | * | 1/1976 | Roesel, Jr. ..................... 310/113 |
| 4,082,970 A | * | 4/1978 | Girardin ........................ 310/113 |
| 4,908,540 A | * | 3/1990 | Motodate et al. ............. 310/240 |
| 6,724,115 B2 | * | 4/2004 | Kusase ..................... 310/156.26 |
| 7,548,005 B2 | * | 6/2009 | Kaizuka et al. ............... 310/114 |
| 7,898,134 B1 | * | 3/2011 | Shaw ............................. 310/114 |

FOREIGN PATENT DOCUMENTS

| | | |
|---|---|---|
| TW | 290267 U | 5/2006 |
| TW | I343518 B | 6/2011 |

* cited by examiner

*Primary Examiner* — Thanh Lam
(74) *Attorney, Agent, or Firm* — Muncy, Geissler, Olds & Lowe, P.C.

(57) ABSTRACT

A motor with power-generating coil module includes: a base that has a shaft tube, a supporting surface surrounding the shaft tube, a first coil module mounted on an outer circumferential surface of the shaft tube, and a second coil module disposed above the supporting surface; a rotor that has a carrier extending a lateral wall toward the base, a shaft rotatably coupling with the shaft tube, and a magnetic member mounted on the lateral wall and having an axial extension and a radial extension, with a first magnetic face on the axial extension and facing the first coil module and a second magnetic face on the radial extension and facing the second coil module; a driving circuit electrically connecting with one of the first and second coil modules; and a power-storing unit electrically connecting with the other one of the first and second coil modules.

6 Claims, 5 Drawing Sheets

MOTOR WITH POWER-GENERATION COIL MODULE

BACKGROUND OF THE INVENTION

1. Field of the Invention

The present invention relates to a motor with power-generating coil module and, more particularly, to a motor having a simple structure.

2. Description of the Related Art

Referring to FIG. 1, an invention of a Taiwan patent with patent number M290267 and entitled as "Light Emit-able Cooling Fan" is shown and regards to a conventional cooling fan capable of power generation, wherein the cooling fan includes a base 81, a fan wheel 82, a driving unit 83, a power-generating unit 84 and a light emitting unit 85. The base 81 has a shaft tube 811. The fan wheel 82 is rotatably coupled with the shaft tube 811 and has a carrier 821, with an end edge of the carrier 821 extending towards the base 81 to form an annular wall 822. The driving unit 83 includes a first magnet ring 831 and a first coil member 832, wherein the first magnet ring 831 is mounted on an inner surface of the annular wall 822 of the fan wheel 82, the first coil member 832 surrounds the shaft tube 811, and there is a first radial gap "A1" between the first magnet ring 831 and the first coil member 832. The power-generating unit 84 includes a second magnet ring 841 and a second coil member 842, wherein the second magnet ring 841 is mounted on an end of the first coil member 832, adjacent to the carrier 821. The second coil member 842 is mounted on the fan wheel 82 and also adjacent to the carrier 821, and there is a second radial gap "A2" between the second magnet ring 841 and the second coil member 842. The light emitting unit 85 is arranged adjacent to the carrier 821, electrically connects with the second coil member 842 and has a LED bulb 851 mounted through the annular wall 822 of the fan wheel 82.

When the cooling fan runs, the first coil member 832 is electrically energized to generate an alternating magnetic field so as to move the first magnet ring 831, and thus the fan wheel 82 turns. At the same time, the second coil member 842 is moved relatively to the second magnet ring 841 by the rotation of the fan wheel 82, and thus the second coil member 842 generates an induced current by the magnetic field of the second magnet ring 841 due to flux linkage. Finally, the LED bulb 851 of the light emitting unit 85 operates to emit light by the induced current.

In order to provide a desirable driving performance of the driving unit 83, a surface of the first magnet ring 831 and a surface of the first coil member 832 facing each other across the first radial gap "A1" should have large areas, so as to improve the magnetic force between the first magnet ring 831 and the first coil member 832. Similarly, in order to improve the electric power generation of the power-generating unit 84, a surface of the second magnet ring 841 and a surface of the second coil member 842 facing each other across the second radial gap "A2" may also have large areas. However, referring to FIG. 1, it is apparent that an increased axial size of this cooling fan is thus caused by the above said large areas of these surfaces. Furthermore, the structure of this conventional cooling fan is complex since the first magnet ring 831 and the second magnet ring 841 are both made of magnet but separately arranged on the fan wheel 82 and the base 81.

Referring to FIG. 2, another invention of a Taiwan patent with patent number I343518 and entitled as "Light Emit-able Cooling Fan" is shown. In comparison with the previous cooling fan, this cooling fan has a fan wheel 91 coupling with a first magnet ring 921 of a driving unit 92 by an inner surface of a lateral wall 911 of the fan wheel 91, and the first magnet ring 921 can be driven by and moved relatively to a first coil member 922 of the driving unit 92. Besides, a bottom edge of the lateral wall 911 of the fan wheel 91 further connects with a second coil member 931 of a power-generating unit 93, with the second coil member 931 capable of moving relatively to a second magnet ring 932. Furthermore, a light emitting unit 94 is mounted on the fan wheel 91 and electrically connects with the second coil member 931. Accordingly, when the first coil member 922 is electrically energized to turn the first magnet ring 921 as well as the fan wheel 91, the second coil member 931 moving relatively to the second magnet ring 932 can generate an induced current to operate the light emitting unit 94.

However, owing to the trend of microminiaturization and thinning tendency of motors, it is desirable to reduce the length, width and thickness of every elements of a motor, including the fan wheel 91, and thus an area of the bottom edge of the lateral wall 911 is quite limited. Therefore, it is difficult to dispose the second coil member 931 on the bottom edge of the lateral wall 911 and may lead to a high manufacture cost since the second coil member 931 has a complex winding structure as shown and can only be arranged in such a limited area of the bottom edge of the lateral wall 911. Moreover, due to the limited area of the bottom edge of the lateral wall 911, even though the second coil member 931 can be mounted on the bottom edge of the lateral wall 911, the second coil member 931 can only provide a small power in electrical generation.

As a result, an improved motor is needed to have a small size and a simple structure and to generate larger electrical power.

SUMMARY OF THE INVENTION

It is therefore the objective of this invention to provide a motor with power-generating coil module, and the motor is capable of rotational driving and power generation while only one magnetic member is used so as to be completed by a simple structure, and thus easy manufacture and low cost in manufacture are achievable.

Another objective of this invention is to provide a motor with power-generating coil module, which may improve the efficiency of the power generation of this motor while keeping the axial size thereof.

The invention discloses a motor with power-generating coil module including a base, a rotor, a driving circuit and a power-storing unit. The base has a shaft tube, a supporting surface, a first coil module and a second coil module, wherein the supporting surface surrounds the shaft tube, the first coil module is mounted on an outer circumferential surface of the shaft tube, and the second coil module is disposed above the supporting surface. The rotor has a carrier, a shaft and a magnetic member, wherein the carrier extends a lateral wall toward the base, the shaft rotatably couples with the shaft tube of the base, the magnetic member is mounted on the lateral wall and has an axial extension and a radial extension, a first magnetic face is on the axial extension and faces the first coil module, and a second magnetic face is on the radial extension and faces the second coil module. The driving circuit electrically connects with one of the first and second coil modules. The power-storing unit electrically connects with the other one of the first and second coil modules.

The invention further discloses that the axial extension is mounted on an inner side of the lateral wall and the radial extension is mounted on a bottom edge of the lateral wall facing the supporting surface.

The invention further discloses that, in radial directions of the rotor, the lateral wall has a first radial width, the axial extension has a second radial width, the radial extension has a third radial width, and the third radial width is larger than a total of the first radial width and the second radial width.

The invention further discloses that, in radial directions of the rotor, the lateral wall has a first radial width, the axial extension has a second radial width, the radial extension has a third radial width, and the third radial width equals to a total of the first radial width and the second radial width.

The invention further discloses that the first coil module has a radial pole face facing the first magnetic face and the second coil module has an axial pole face facing the second magnetic face.

The invention further discloses that a magnetic flux sealing layer made of magnetic-conducting material is formed at a part of the lateral wall where abuts against the magnetic member.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
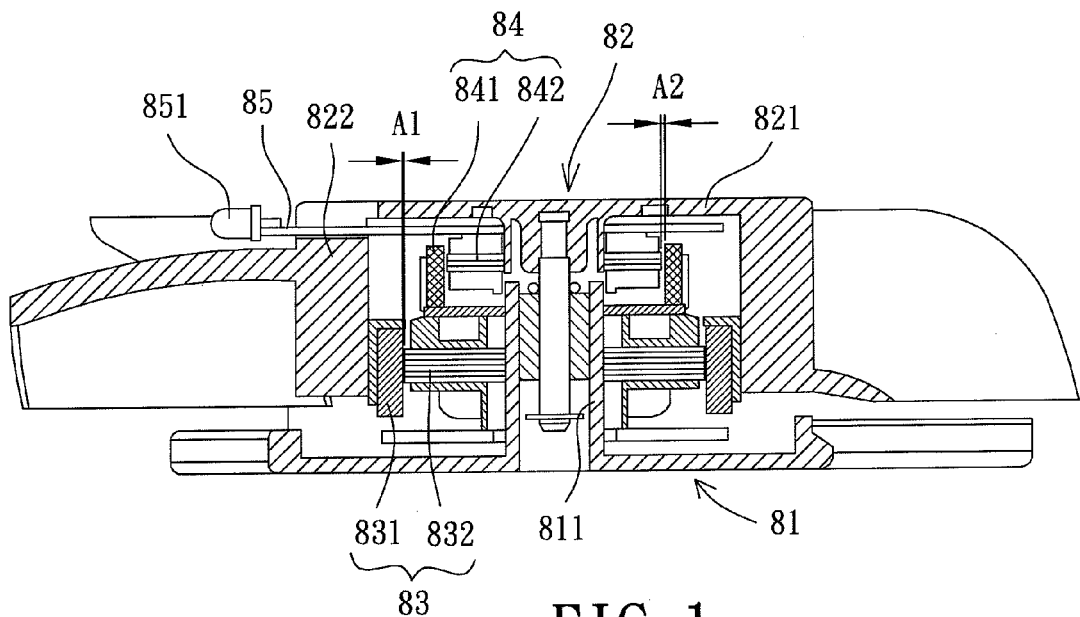
FIG. 1 shows a cross-sectional view of a conventional cooling fan capable of power generation.
Figure 2:
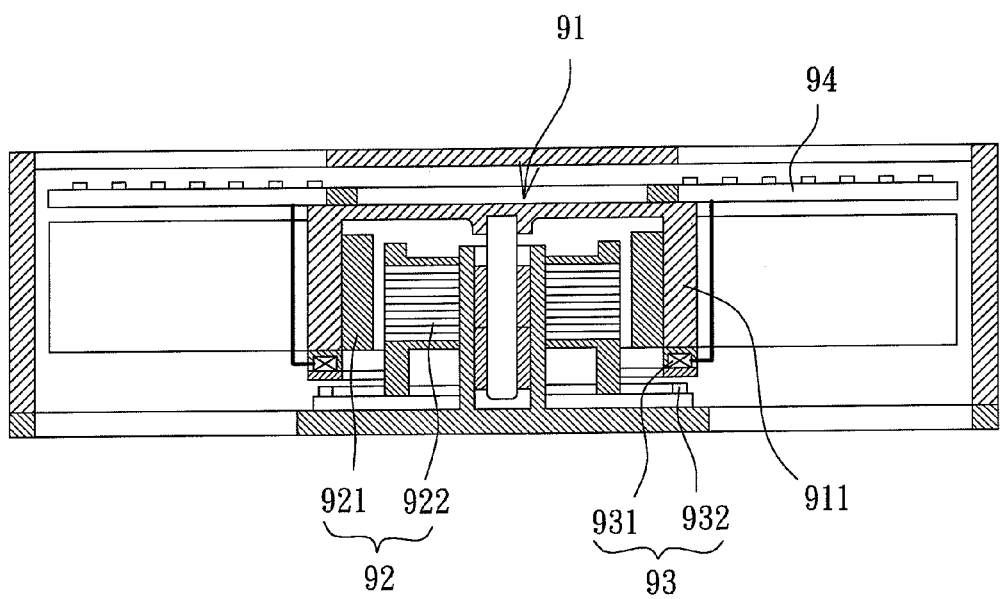
FIG. 2 shows a cross-sectional view of another conventional cooling fan capable of power generation.
Figure 3:
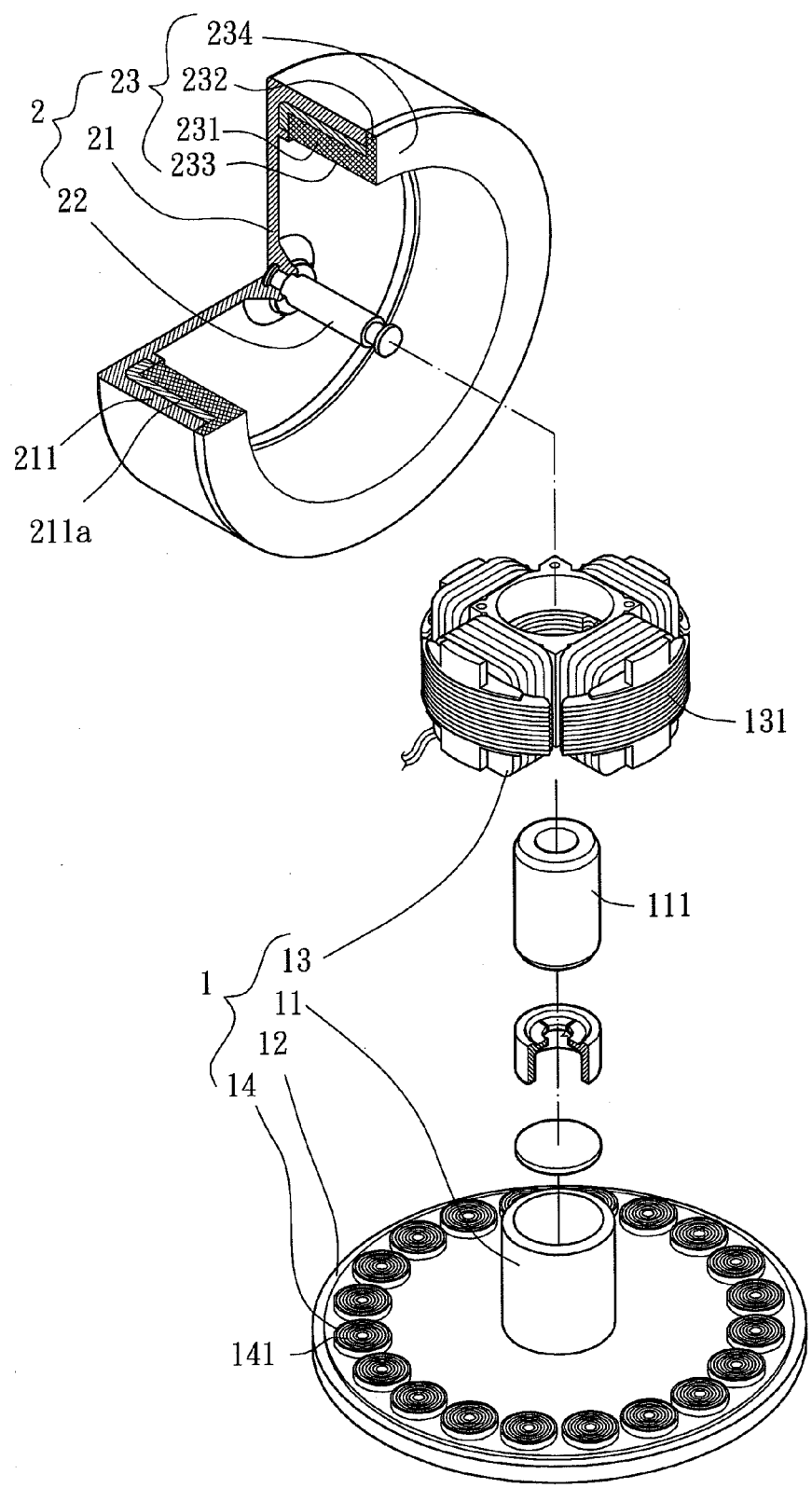
FIG. 3 shows a perspective and exploded view of a motor with power-generating coil module according to a first embodiment of the invention.
Figure 4:
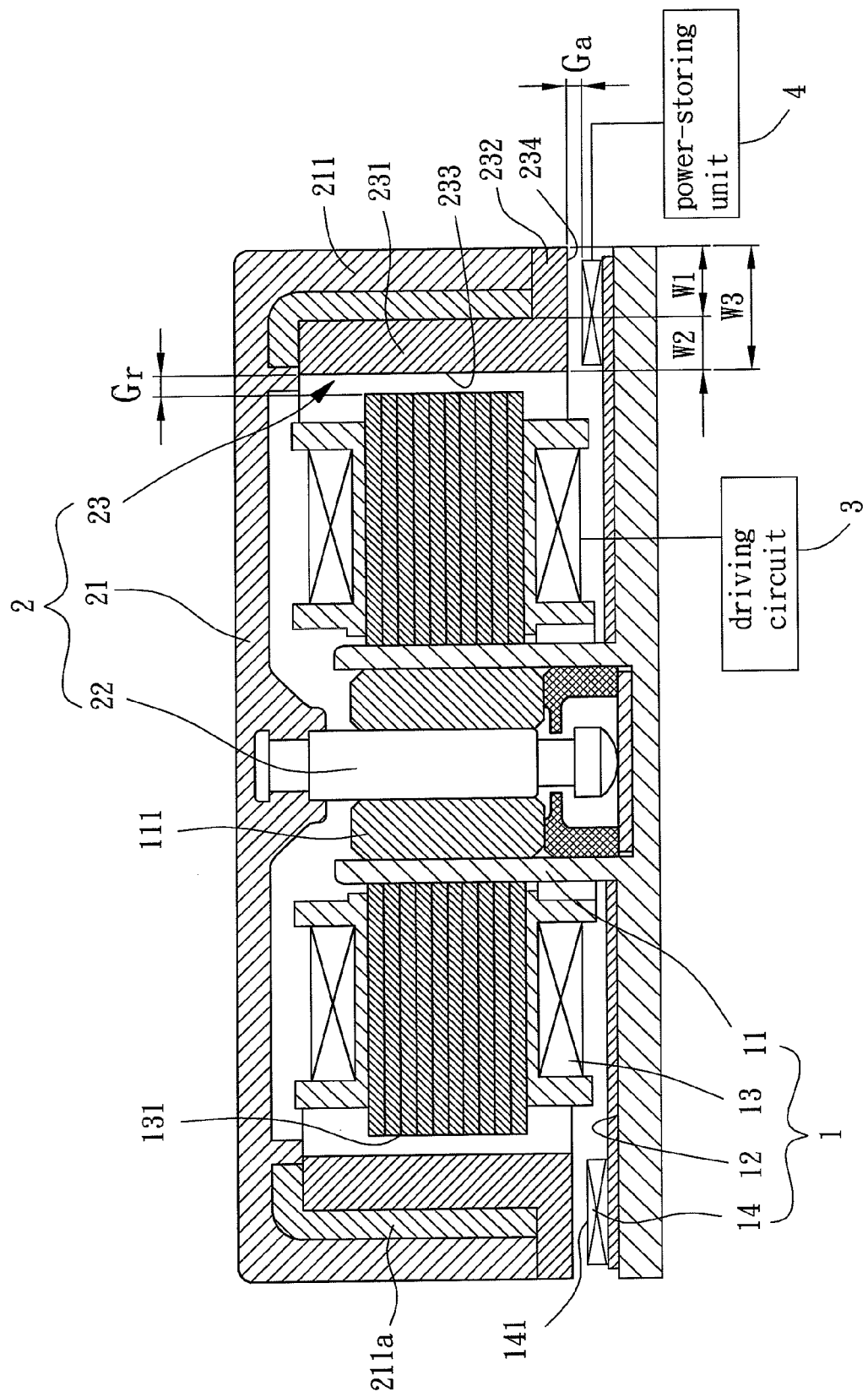
FIG. 4 shows a cross-sectional view of the motor according to the first embodiment of the invention.

FIGS. 3 and 4 show a motor with a power-generating coil module according to a first embodiment of the invention. The motor with a power-generating coil module includes a base 1, a rotor 2, a driving circuit 3 and a power-storing unit 4, wherein the rotor 2 is rotatably mounted on the base 1, the driving circuit 3 electrically connects with the base 1 and generates a driving signal to turn the rotor 2 through the base 1, and the power-storing unit 4 electrically connects with the base 1 and stores the electric power generated by the turned rotor 2.

The base 1 includes a shaft tube 11, a supporting surface 12, a first coil module 13 and a second coil module 14. The shaft tube 11 receives a bearing 111. The supporting surface 12 surrounds the shaft tube 11. The first coil module 13 is mounted on an outer circumferential surface of the shaft tube 11 and has a radial pole face 131 facing the rotor 2 across a radial gap "Gr," with the radial pole face 131 preferably formed by outer edges of laminated pole pieces of the first coil module 13. The second coil module 14 is disposed above the supporting surface 12, surrounds the shaft tube 11 and has an axial pole face 141 facing the rotor 2 across an axial gap "Ga."

The rotor 2 includes a carrier 21, a shaft 22 and a magnetic member 23. An outer edge of the carrier 21 extends toward the base 1 to form a lateral wall 211. The shaft 22 protrudes toward the base 1 from the carrier 21 and rotatably couples with the shaft tube 11 such as coupling with the bearing 111 inside the shaft tube 11, so that the rotor 2 may rotate relatively to the base 1. The magnetic member 23 is mounted on the lateral wall 211 of the carrier 21 and is preferably made of a magnet, such as a magnet ring having N and S poles arranged in a stagger way circumferentially. Specifically, the magnetic member 23 has an axial extension 231 mounted on an inner side of the lateral wall 211, a radial extension 232 mounted on a bottom edge of the lateral wall 211 facing the supporting surface 12, a first magnetic face 233 on the axial extension 231 and facing the radial pole face 131 of the first coil module 13, and a second magnetic face 234 on the radial extension 232 and facing the axial pole face 141 of the second coil module 14.

Referring to FIG. 4, it is defined that, in radial directions of the rotor 2, the lateral wall 211 has a first radial width "W1," the axial extension 231 has a second radial width "W2," and the radial extension 232 has a third radial width "W3." In this embodiment, a total of the first radial width "W1" and the second radial width "W2" equals the third radial width "W3," and the magnetic member 23 including the axial extension 231 and the radial extension 232 is integrally formed. Besides, there can be a magnetic flux sealing layer 211a made of magnetic-conducting material and formed at the inner side of the lateral wall 211 abutting against the magnetic member 23 so as to reduce magnetic leakage of the magnetic member 23.

The driving circuit 3 electrically connects with the first coil module 13 and the power-storing unit 4 electrically connects with the second coil module 14 as shown in FIG. 4. However, since the connection between the driving circuit 3, the power-storing unit 4 and the base 1 is for the rotor 2 to be driven by the driving signal of the driving circuit 3 through the base 1 and for the power-storing unit 4 to store electrical power generated by the rotation of the rotor 2 through the base 1, a position relationship between the driving circuit 3, the power-storing unit 4, and the first and second coil modules 13, 14 of the base 1 is not limited to the showing of FIG. 4. Namely, the driving circuit 3 can be electrically connected with the second coil module 14 while the power-storing unit 4 electrically connects with the first coil module 13. Furthermore, the driving circuit 3 can be arranged outside the motor of the present invention or formed on a circuit board inside this motor and mounted on the base 1.

Referring to FIG. 4 again, when the motor of the present invention is driven, the driving circuit 3 outputs the driving signal for the first coil module 13 to generate an alternating magnetic field, so that the alternating magnetic field may move the magnetic member 23 through the first magnetic face 233 so as to turn the rotor 2. At the same time, the magnetic member 23 is moved relatively to the second coil module 14 by the rotation of the rotor 2, and thus the second coil module 14 generates an induced current by the magnetic field of the second magnetic face 234 of the magnetic member 23 due to flux linkage. Finally, the power-storing unit 4 may store the electric power of the induced current provided by the second coil module 14.

Particularly, the character of the motor of this embodiment lies in that the rotor 2 does not have any coil and only the magnetic member 23 is used for providing the magnetic field, and thus the radial width of the lateral wall 211 can be small. Therefore, when microminiaturization and thinning tendency are required, an easy manufacture and low cost in manufacture are still achievable. Moreover, owing to the integrally formed magnetic member 23 which includes the axial extension 231 and the radial extension 232, only a single magnet serving as the magnetic member 23 is needed for rotational driving as well as for electric power generation. Furthermore, even though the areas of the second magnetic face 234 and the axial pole face 141 are increased to improve the efficiency of the power generation of this motor, the axial size of this motor is kept since the second magnetic face 234 and the axial pole face 141 are axially spaced via the axial gap "Ga."

Figure 5:
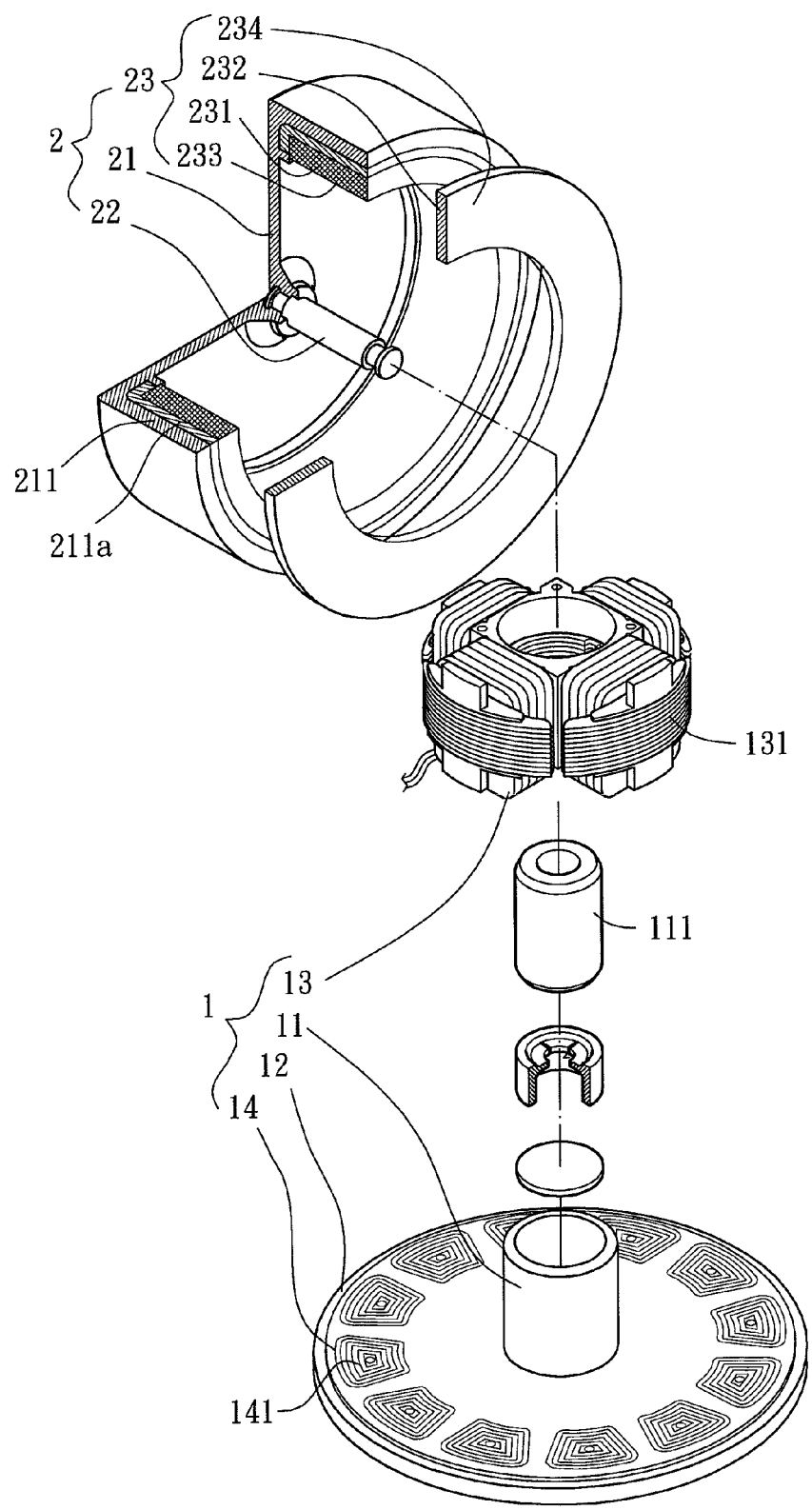
FIG. 5 shows a perspective and exploded view of a motor with power-generating coil module according to a second embodiment of the invention.
Figure 6:
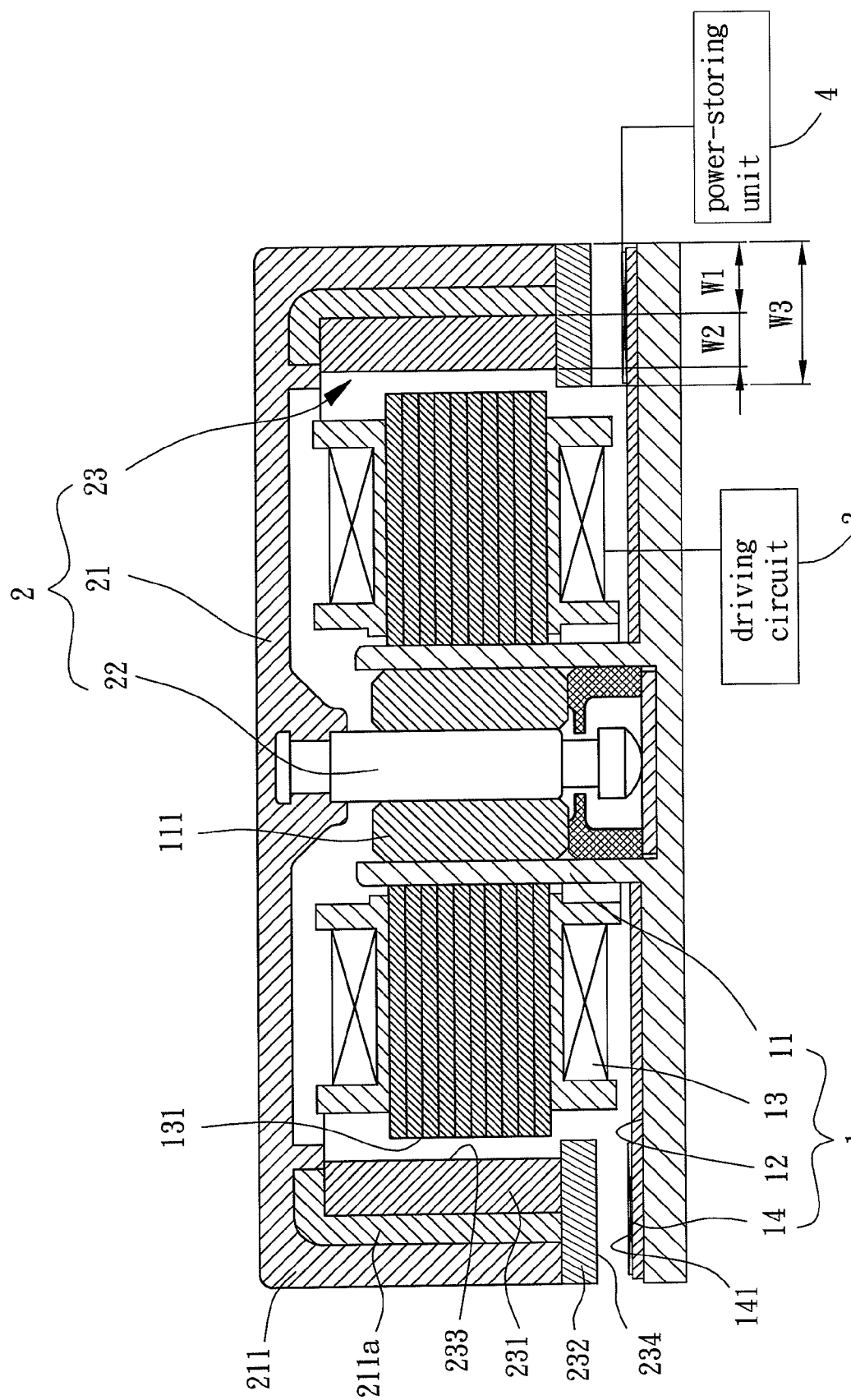
FIG. 6 shows a cross-sectional view of the motor according to the second embodiment of the invention.

Please refer to FIGS. 5 and 6, wherein a motor with a power-generating coil module according to a second embodiment of the invention is shown. In this embodiment, the axial extension 231 and the radial extension 232 are separately formed before being combined to provide the magnetic member 23. Besides, in this embodiment, the third radial width "W3" is larger than the total of the first radial width "W1" and the second radial width "W2" so as to enlarge the area of the second magnetic face 234. Correspondingly, an improved efficiency in power generation of this motor can be achieved if the axial pole face 141 of the second coil module 14 is also expanded. As a result, the motor of this embodiment can generate a larger electrical power without increasing the size thereof.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A motor with power-generating coil module, comprising:
    a base having a shaft tube, a supporting surface, a first coil module and a second coil module, wherein the supporting surface surrounds the shaft tube, the first coil module is mounted on an outer circumferential surface of the shaft tube, and the second coil module is disposed above the supporting surface;
    a rotor having a carrier, a shaft and a magnetic member, wherein the carrier extends a lateral wall toward the base, the shaft rotatably couples with the shaft tube of the base, the magnetic member is mounted on the lateral wall and has an axial extension and a radial extension, a first magnetic face is on the axial extension and faces the first coil module, and a second magnetic face is on the radial extension and faces the second coil module;
    a driving circuit electrically connecting with one of the first coil module and the second coil module; and
    a power-storing unit electrically connecting with the other one of the first coil module and the second coil module.

2. The motor with power-generating coil module as claimed in claim 1, wherein the axial extension is mounted on an inner side of the lateral wall and the radial extension is mounted on a bottom edge of the lateral wall facing the supporting surface.

3. The motor with power-generating coil module as claimed in claim 1, wherein, in radial directions of the rotor, the lateral wall has a first radial width, the axial extension has a second radial width, the radial extension has a third radial width, and the third radial width is larger than a total of the first radial width and the second radial width.

4. The motor with power-generating coil module as claimed in claim 1, wherein, in radial directions of the rotor, the lateral wall has a first radial width, the axial extension has a second radial width, the radial extension has a third radial width, and the third radial width is equal to a total of the first radial width and the second radial width.

5. The motor with power-generating coil module as claimed in claim 1, wherein the first coil module has a radial pole face facing the first magnetic face and the second coil module has an axial pole face facing the second magnetic face.

6. The motor with power-generating coil module as claimed in claim 1, wherein a magnetic flux sealing layer made of magnetic-conducting material is formed at a part of the lateral wall where abuts against the magnetic member.

* * * * *